3,441,440
ACTIVATION OF NICKEL FOIL AND PRODUCT
SO PRODUCED
Norman Mark Silverstone, Selly Park, Birmingham, England, assignor to The International Nickel Company, Inc., New York, N.Y., a corporation of Delaware
No Drawing. Filed Nov. 8, 1965, Ser. No. 506,897
Claims priority, application Great Britain, Nov. 16, 1964, 46,575/64
Int. Cl. H01m 43/04
U.S. Cl. 136—29    8 Claims

ABSTRACT OF THE DISCLOSURE

A process for activating nickel foil for accumulator cells, which process comprises masking nickel foil surfaces to be activated with an electrically non-conducting porous mask, initially anodically oxidizing the thus-masked nickel foil surface, removing the mask and then continuing the anodic oxidation treatment, is disclosed. A high capacity activated nickel foil is also disclosed.

---

The present invention relates to accumulator electrodes and the production thereof and more particularly to activated nickel foil accumulator electrodes and to a process for activating nickel foil.

Nickel plates used as electrodes in alkaline accumulators must be active in the electrolyte used, and it is well known that nickel is passive in alkaline electrolytes. Sintered nickel plates may be made active by anodic treatment in an electrolyte of sodium bicarbonate, nickel hydroxide being formed on the surface. Thereafter, the resultant plates may be used as positive electrodes in an alkaline battery.

Activated sintered nickel plates have found wide use as positive electrodes in alkaline accumulators. However, because sintered nickel plates have diffused bonds which do not display the strength of wrought material the sintered plates out of necessity must be designed to be large and bulky in order to insure adequate strength. Activated nickel foil has been considered an ideal positive electrode because the final size of the accumulator could be substantially reduced, but attempts to activate nickel foil by anodic oxidation have been on the whole unsuccessful. The reason prior attempts have been unsuccessful is that nickel foil remains passive when made the anode in a solution of sodium bicarbonate and no active surface is formed.

It has now been discovered that activated nickel foil can be produced by conducting anodic oxidation in a special manner.

It is an object of the present invention to provide sturdy, lightweight activated nickel foil useful as positive electrodes in alkaline accumulators.

Another object of the invention is to provide activated nickel foil for positive electrodes in alkaline accumulators.

The invention also contemplates providing a process activating nickel foil by anodic oxidation.

It is a further object of the invention to provide an electrolytic process for activating nickel foil.

Other objects and advantages will become apparent from the following description.

Generally speaking, the present invention contemplates activating nickel foil by contacting the surface or surfaces to be activated with an electrically non-conducting, porous mask and anodically oxidizing the nickel foil. The bath in which the nickel foil is anodically oxidized can be any of the well known baths employed for this purpose such as sodium bicarbonate solutions or sodium borate and boric acid solutions.

Nickel foil, as used herein, refers to non-porous nickel material having a thickness less than about one millimetre and can be produced by rolling, electro-deposition, electroless deposition and deposition from nickel carbonyl. Nickel foil itself is of course non-porous, and the discovery that its surface can be rendered active by the method described above is extremely remarkable.

Activation of nickel foil requires as an essential step the contacting of the nickel foil with a porous mask during the anodic oxidation treatment. The porous mask to be effective must be electrically non-conducting. A wide range of synthetic and naturally occuring materials such as nylon, polyethylene, polyvinylchloride, polyester, polystyrene and glass, which are not only electrically non-conducting but are also inert to the anodic oxidation bath, can be employed. The thickness of the mask is not critical but should be controlled to allow adequate circulation of the bath solution in order to achieve economical rates of anodic oxidation. In most instances it is preferred to employ masks less than one millimetre thick. The porosity of the porous mask should be controlled to have an average pore size of from about 5 microns to about 200 microns and characterized by an airflow of from about 50 cubic feet per minute per square foot at a pressure of 8 inches of water gauge (c.f.m./sq. ft./8" w.g.) to about 2,000 c.f.m./sq. ft./8" w.g. Control of the properties of the porous mask within the above-specified ranges insures economical and effective anodic oxidation of nickel foil. Uniform distribution of active nickel hydroxide which is the product of anodic oxidation of the nickel foil is dependent on the uniformity of porosity of the mask, and accordingly, the porosity of the mask or membrane should be as uniform as possible.

As stated hereinbefore, the conditions and the baths conventionally employed in activating sintered nickel plates are effective in anodically oxidizing nickel foil as long as the nickel foil is contacted at least initially with an inert, i.e., non-conductive, porous mask. Thus, aqueous baths containing from about 50 grams per litre (g.p.l.) to about 100 g.p.l. sodium bicarbonate and which are maintained at a pH of about 7 to about 9 can effectively be employed. Likewise, aqueous baths containing about 50 g.p.l. to about 500 g.p.l. of sodium borate and about 10 g.p.l. to about 40 g.p.l. of boric acid and maintained at a pH of about 7 to about 9 are effective in activating nickel foil. The temperature of the baths can vary between about 45° C. and about 70° C. while the current densities employed may be in the range of about 100 to about 500 micro-amperes per square centimeter.

Generally the duration of anodic oxidation can be short and there is little advantage in increasing the time above about 2 hours. After the anodic oxidation treatment with the mask has been completed, the porous mask is removed. The nickel foil has deposited on the surface or surfaces treated a coating of active nickel hydroxide. The capacity of the active mass is small but this may be greatly enhanced by further electrolytic action with the porous mask removed. The current density may be lower than that employed with the mask in position and the duration of anodic oxidation is determined by the desired final capacity which the activated nickel foil is to exhibit.

For the purpose of giving those skilled in the art a better understanding of the invention, the following illustrative examples are given:

EXAMPLE I

Nickel foil is immersed as the anode in an electrolyte containing 90 g./l. of sodium bicarbonate. Porous polyethylene 1/32" thick with an average pore size of 50 microns and a maximum airflow of 500 c.f.m./sq. ft./8″ w.g. is put in contact with the foil. The electrolyte is maintained at 60° C. and the pH is maintained constant at about 8.4 by the passage of carbon dioxide through the electrolyte. The current density is 200 micro-amperes per square centimetre and the duration of the treatment is 2 hours. The film of active material so formed was subjected to charge-discharge cycling and found to have a capacity of 10 micro-ampere hours per square centimetre.

EXAMPLE II

Nickel foil is immersed as the anode in an electrolyte containing 90 g./l. of sodium bicarbonate. Porous polyethylene 1/32″ thick with an average pore size of 50 microns and a maximum airflow of 500 c.f.m./sq. ft./8″ w.g. is put in contact with the foil. The electrolyte is maintained at 60° C. and the pH is maintained constant at about 8.4 by the passage of carbon dioxide through the electrolyte. The current density is 200 micro-amperes per square centimetre and the duration of the treatment is 2 hours. The porous polyethylene is then removed and the foil with its film of active material subjected to further electrolytic action in the electrolyte at a current densiy of 100 micro-amperes per square centimetre for 4 hours. The film of active material so formed was found to have a capacity of 25 micro-ampere hours per square centimetre.

The present invention is particularly applicable to processing of nickel foil to activate the nickel foil for subsequent use as positive electrodes in alkaline storage batteries. Batteries using the activated nickel foil of the invention can have very large superficial plate area per unit volume. Such batteries of high capacity can be of small size and can advantageously replace high-capacity capacitors, since they have greater electrical output with a very high discharge rate.

Although the present invention has been described in conjunction with preferred embodiments, it is to be understood that modifications and variations may be resorted to without departing from the spirit and scope of the invention, as those skilled in the art will readily understand. Such modifications and variaitons are considered to be within the purview and scope of the invention and appended claims.

I claim:
1. A process for activating nickel foil which comprises establishing a bath for anodically oxidizing nickle, introducing nickel foil as an anode, contacting at least one surface of the nickel foil with a thin, electrically non-conducting porous mask and anodically oxidizing said nickel foil surface, removing said porous mask and continuing the anodic oxidation to form activated nickel foil.

2. A process as described in claim 1 wherein anodic oxidation is conducted in a bath from the group consisting of an aqueous solution of sodium bicarbonate and an aqueous solution of boric acid and sodium borate.

3. A process as described in claim 1 wherein said electrically non-conducting, porous mask is made from a member of the group consisting of nylon, polyethylene, polyvinyl chloride, polyester, polystyrene and glass.

4. A process as described in claim 1 wherein said porous mask is less than about one millimetre thick.

5. A process as described in claim 1 where said porous mask has an average pore size of from about 5 microns to about 200 microns.

6. A process as described in claim 1 wherein a current density of about 100 to about 500 micro-amperes per square centimetre is employed when anodically oxidizing said nickel foil.

7. A process for activating nickel foil which comprises establishing a bath from the group consisting of an aqueous solution of sodium bicarbonate and an aqueous solution of boric acid and sodium borate for anodically oxidizing nickel, introducing nickel foil as an anode, contacting at least one surface of the nickel foil with a thin electrically non-conducting porous mask made from a member of the group consisting of nylon, polyethylene, polyvinyl chloride, polyester, polystyrene and glass wherein said porous mask is less than about 1 mm. thick having an average pore size of from about 5 microns to about 200 microns and anodically oxidizing said nickel foil surface using a current density in the range 100 to 500 micro-amperes per square centimetre for a period of up to about 2 hours, removing said porous mask and continuing the anodic oxidation at a current density in the range 100 to 500 micro-amperes per square centimetre for a period of at least about 1 hour to form activated nickel foil.

8. An activated nickel foil characterized by high micro-ampere hours per square centimetre capacities produced by the process of claim 1.

References Cited
UNITED STATES PATENTS

| | | | |
|---|---|---|---|
| 794,240 | 7/1905 | Meister et al. | 204—56 |
| 2,694,743 | 11/1954 | Ruskin et al. | 204—38 XR |
| 3,159,507 | 12/1964 | Abbe et al. | 136—146 XR |
| 3,188,243 | 6/1965 | Booth et al. | 136—146 XR |

FOREIGN PATENTS

| | | |
|---|---|---|
| 541,347 | 11/1941 | Great Britain. |
| 44,410 | 11/1938 | Netherlands. |

JOHN H. MACK, Primary Examiner.

G. L. KAPLAN, Assistant Examiner.

U.S. Cl. X.R.

204—56